(12) United States Patent
Takamoto

(10) Patent No.: US 11,397,637 B2
(45) Date of Patent: Jul. 26, 2022

(54) METHOD OF CONTROLLING INFORMATION PROCESSOR, NON-TRANSITORY CONTROLLER-READABLE MEDIUM STORING PROGRAM, AND COMMUNICATION SYSTEM

(71) Applicant: SEIKO EPSON CORPORATION, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/930,928

(22) Filed: Jul. 16, 2020

(65) Prior Publication Data
US 2021/0019212 A1    Jan. 21, 2021

(30) Foreign Application Priority Data

Jul. 19, 2019 (JP) .............................. JP2019-133438

(51) Int. Cl.
*G06F 11/07* (2006.01)
*G06Q 20/20* (2012.01)
*G06F 13/10* (2006.01)

(52) U.S. Cl.
CPC ........ *G06F 11/079* (2013.01); *G06F 11/0736* (2013.01); *G06F 11/0751* (2013.01); *G06F 13/102* (2013.01); *G06Q 20/20* (2013.01)

(58) Field of Classification Search
CPC ............... G06F 11/079; G06F 11/0751; G06F 11/0736; G06F 11/3055; G06F 11/3013
See application file for complete search history.

(56) References Cited

U.S. PATENT DOCUMENTS

| | | | | |
|---|---|---|---|---|
| 5,943,503 A | * | 8/1999 | Kai | G06F 3/1259 708/833 |
| 6,389,544 B1 | * | 5/2002 | Katagiri | G06F 3/1229 713/300 |
| 7,232,063 B2 | * | 6/2007 | Fandel | G06Q 20/20 235/376 |

FOREIGN PATENT DOCUMENTS

JP    H07-016190    2/1995

* cited by examiner

*Primary Examiner* — Nadeem Iqbal
(74) *Attorney, Agent, or Firm* — Workman Nydegger

(57) ABSTRACT

A POS terminal has: a device driver; a POS application that communicates with a peripheral through the device driver; a filter driver that acquires communication information related to communication performed between the POS application and the peripheral through the device driver, the communication information including time information; and a failure detection application that acquires communication information from the filter driver over a predetermined period, defines a decision reference according to the communication information acquired over the predetermined period, and makes a decision about an abnormality related to the peripheral through a comparison between the defined decision reference and communication information acquired from the filter driver after the predetermined period.

13 Claims, 8 Drawing Sheets

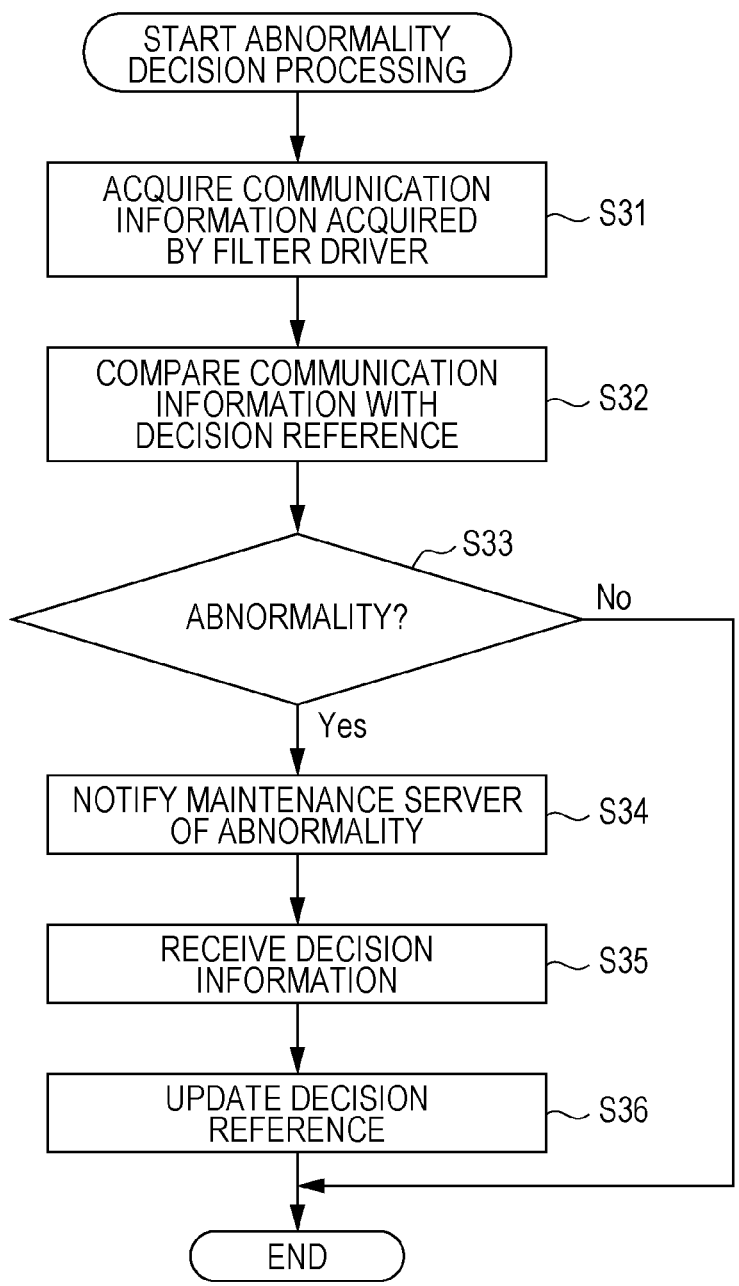

METHOD OF CONTROLLING INFORMATION PROCESSOR, NON-TRANSITORY CONTROLLER-READABLE MEDIUM STORING PROGRAM, AND COMMUNICATION SYSTEM

The present application is based on, and claims priority from JP Application Serial Number 2019-133438, filed Jul. 19, 2019, the disclosure of which is hereby incorporated by reference herein in its entirety.

BACKGROUND

1. Technical Field

The present disclosure relates to a method of controlling an information processor, a non-transitory controller-readable medium storing a program, and a communication system.

2. Related Art

Japanese Examined Patent Application Publication No. 07-016190, for example, discloses a conventional technology by which a communication abnormality is recognized when a difference between the number of data receptions and the number of data transmissions reaches a predetermined number of times in a communicator that adds its own data to data received from an apparatus disposed upstream and transmits the resulting data to an apparatus disposed downstream.

With the technology disclosed in Japanese Examined Patent Application Publication No. 07-016190, it is not easy to add a function to recognize a communication abnormality to an existing system because a need arises to modify an exiting application incorporated into the communicator.

SUMMARY

A method, in an embodiment of the present disclosure, of controlling a an information processor is a method of controlling an information processor configured to communicate with a peripheral, the information processor having a device driver, an application configured to communicate with the peripheral through the device driver, and a filter driver configured to acquire communication information related to communication performed between the application and the peripheral through the device driver, the communication information including time information indicating a time of the communication. The method includes: acquiring communication information from the filter driver over a predetermined period; defining a decision reference according to which a decision is made about an abnormality caused during communication with the peripheral or an abnormality in the peripheral, according to the acquired communication information; and making a decision about an abnormality caused during communication with the peripheral or an abnormality in the peripheral through a comparison between the defined decision reference and communication information acquired from the filter driver after the predetermined period.

A non-transitory controller-readable medium in an embodiment of the present disclosure stores a program causing a processor in an information processor configured to communicate with a peripheral, the information processor having a device driver, an application configured to communicate with the peripheral through the device driver, and a filter driver configured to acquire communication information related to communication performed between the application and the peripheral through the device driver, the communication information including time information indicating a time of the communication, to acquire communication information from the filter driver over a predetermined period, to define a decision reference according to which a decision is made about an abnormality caused during communication with the peripheral or an abnormality in the peripheral, according to the acquired communication information, and to make a decision about an abnormality caused during communication with the peripheral or an abnormality in the peripheral through a comparison between the defined decision reference and communication information acquired from the filter driver after the predetermined period.

A communication system in an embodiment of the present disclosure includes: a peripheral; and an information processor configured to have a device driver, a first application configured to communicate with the peripheral through the device driver, a filter driver configured to acquire communication information related to communication performed between the first application and the peripheral through the device driver, the communication information including time information indicating a time of the communication, and a second application configured to acquire communication information from the filter driver over a predetermined period, to define a decision reference according to which a decision is made about an abnormality caused during communication with the peripheral or an abnormality in the peripheral, according to the acquired communication information, and to make a decision about an abnormality caused during communication with the peripheral or an abnormality in the peripheral through a comparison between the defined decision reference and communication information acquired from the filter driver after the predetermined period.

BRIEF DESCRIPTION OF THE DRAWINGS

FIG. 8 is a flowchart illustrating a flow of abnormality decision processing.

DESCRIPTION OF EXEMPLARY EMBODIMENTS

Figure 1:
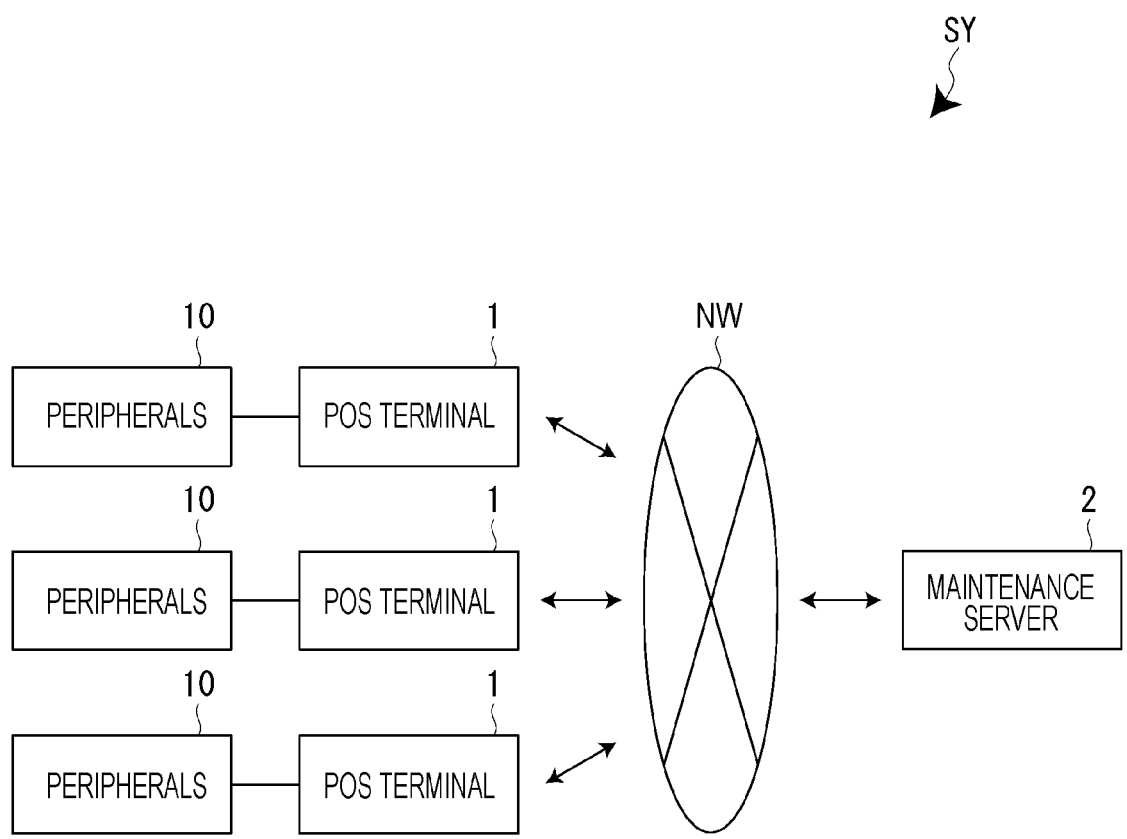
FIG. 1 illustrates the system structure of a communication system.

A method of controlling an information processor, a non-transitory controller-readable medium storing a program, and a communication system according to an embodiment will be described below with reference to the attached drawings. FIG. 1 illustrates the structure of a communication system SY. The communication system SY has one or more point-of-sale system (POS) terminals 1, peripherals 10, each of which is coupled to one POS terminal 1, and a maintenance server 2. Each POS terminal 1 and the maintenance server 2 are coupled together through a network NW. The network NW is, for example, an Internet communication network or a local area network (LAN). The POS terminal 1 is an example of an information processor. The maintenance server 2 is an example of an external server.

The POS terminal 1, also referred to as a cash register, performs accounting processing at a retail store such a supermarket or convenience store. Accounting processing includes input of product information, settlement, the issuing of accounting receipts, and other processing.

The maintenance server 2 is, for example, a server operated by a maintenance and management service company responsible for maintenance and management of the POS terminals 1. The maintenance server 2 acquires various types of information from the POS terminals 1 coupled to the maintenance server 2 through the network NW, and provides maintenance and management services according to the acquired information. For example, upon the acquisition of error information from a POS terminal 1, the maintenance server 2 displays, on the display screen, the error information and information that identifies the POS terminal 1 that has transmitted the error information. An operator at the maintenance and management service company confirms the occurrence of the error, after which the operator makes contact with a person in charge at the retail store by telephone, dispatches a service person, and performs other services.

The POS terminal 1 in this embodiment collects communication information related to communication with the relevant peripheral 10, and decides whether there is an abnormality caused during communication with the peripheral 10 and whether the peripheral 10 has an abnormality according to the collected information. When the POS terminal 1 decides that there is an abnormality caused during communication with the peripheral 10 or that the peripheral 10 has an abnormality, the POS terminal 1 notifies the maintenance server 2 of the abnormality. An example of an abnormality caused during communication with the peripheral 10 is a break in communication between the POS terminal 1 and the peripheral 10. An example of an abnormality in the peripheral 10 is an error in the peripheral 10. In the description below, an abnormality caused during communication with the peripheral 10 or an abnormality in the peripheral 10 will be referred to as an abnormality related to the peripheral 10.

Figure 2:
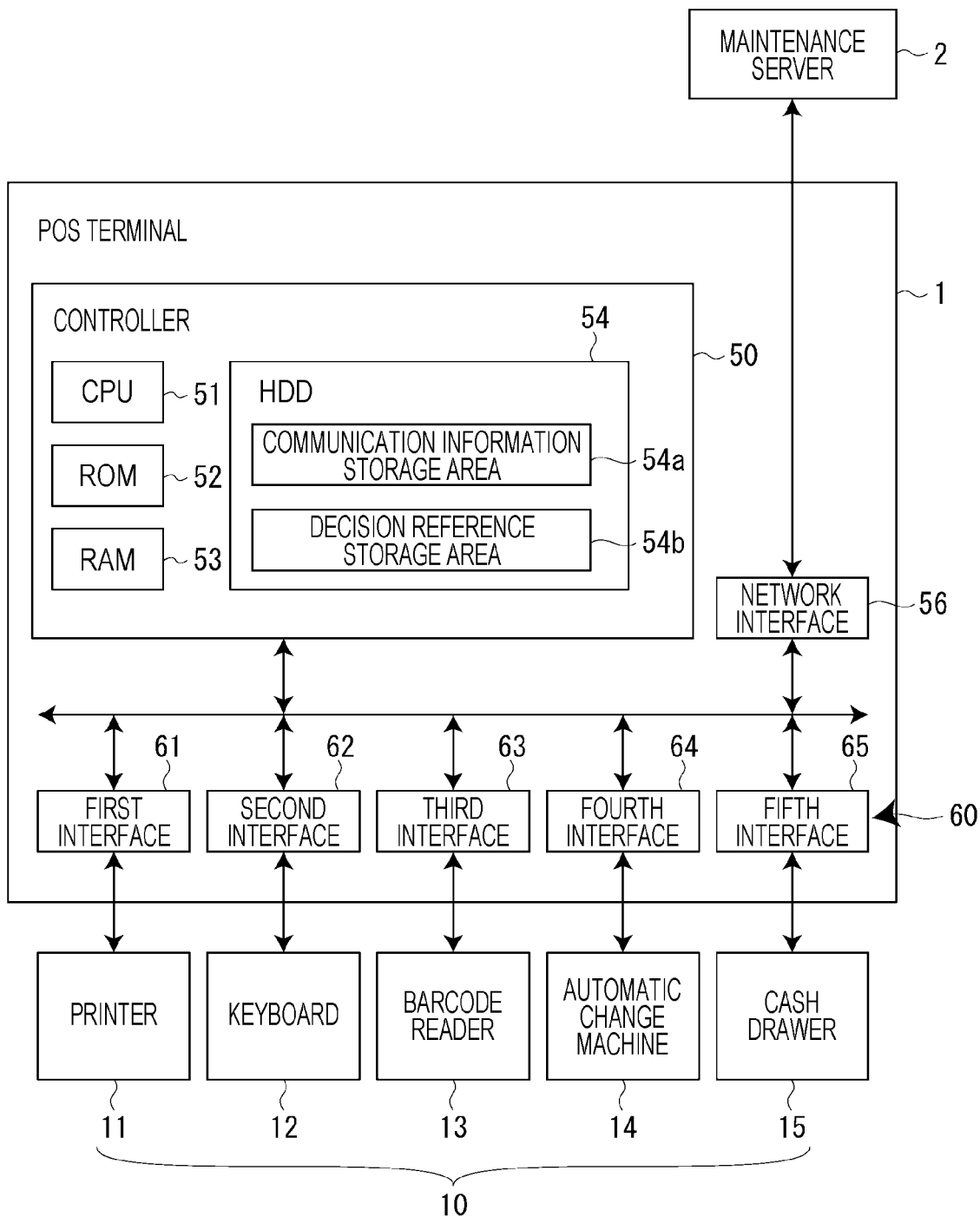
FIG. 2 is a block diagram illustrating the hardware structure of a POS terminal.

The peripheral 10 is assumed to be a printer 11, a display 12, a barcode reader 13, an automatic change machine 14, a cash drawer 15, or another device involved in accounting processing (see FIG. 2 and other drawings).

In this embodiment, the POS terminal 1 and peripherals 10 are mutually coupled through serial interfaces. Among the peripherals 10 coupled through the serial interfaces, the method in which a signal changes and the communication protocol differ depending on the peripheral 10. Therefore, the POS terminal 1 cannot monitor the states of these peripherals 10 in a unified manner. This makes it difficult for the POS terminal 1 to decide whether there is an abnormality related to the peripheral 10.

In view of this, the POS terminal 1 in this embodiment acquires communication information over a predetermined period and defines a decision reference according to which a decision is made about an abnormality related to the peripheral 10, according to communication information acquired over the predetermined period. After having defined the decision reference, the POS terminal 1 compares the acquired communication information with the defined decision reference to make a decision about an abnormality related to the peripheral 10. A method of defining a decision reference and a method of making a decision about an abnormality related to the peripheral 10 will be mainly described below.

FIG. 2 is a block diagram illustrating the hardware structure of the POS terminal 1. The POS terminal 1 has a controller 50, a network interface 56, and a serial interface group 60 as main hardware components. The controller 50 is an example of a processor.

The controller 50 includes a central processing unit (CPU) 51, a read-only memory (ROM) 52, a random-access memory (RAM) 53, and a hard disk drive (HDD) 54. The CPU 51 is a processor. The ROM 52 is a memory that stores control programs. The RAM 53 is a memory used as a work area. To perform various types of computation processing, the CPU 51 reads out programs stored in the ROM 52 or HDD 54, loads the read-out programs into the RAM 53, and executes these programs.

The controller 50 may use a processor other than the CPU 51. A processor may be structured with a hardware circuit such as, for example, an application-specific integrated circuit (ASIC). The processor may also be structured so that at least one CPU and a hardware circuit such as an ASIC operate in cooperation. The controller 50 has a real time clock (RTC), so the CPU 51 can acquire, from the RTC, a time at which a predetermined trigger (event) or communication has occurred and a time interval.

The HDD 54, which is a non-volatile auxiliary storage, has a communication information storage area 54a and a decision reference storage area 54b. The communication information storage area 54a stores communication information acquired by the CPU 51. The communication information storage area 54a is an example of a storage. The decision reference storage area 54b stores the decision reference defined by the CPU 51.

The network interface 56 communicates with the maintenance server 2 through the network NW.

The serial interface group 60 includes a first interface 61, a second interface 62, a third interface 63, a fourth interface 64, and a fifth interface 65.

The first interface 61 is coupled to the printer 11. The second interface 62 is coupled to the display 12. The third interface 63 is coupled to the barcode reader 13. The fourth interface 64 is coupled to the automatic change machine 14. The fifth interface 65 is coupled to the cash drawer 15.

The printer 11 prints accounting receipts. The display 12 displays product prices and a settlement amount. The barcode reader 13 reads a barcode attached to or printed on a product and acquires a product code. The automatic change machine 14 calculates a change by subtracting a settlement amount from the amount of inserted cash, and dispenses cash by the amount of calculated change. The cash drawer 15 has a drawer in which cash is stored. The cash drawer 15 can open and close the drawer.

Figure 3:
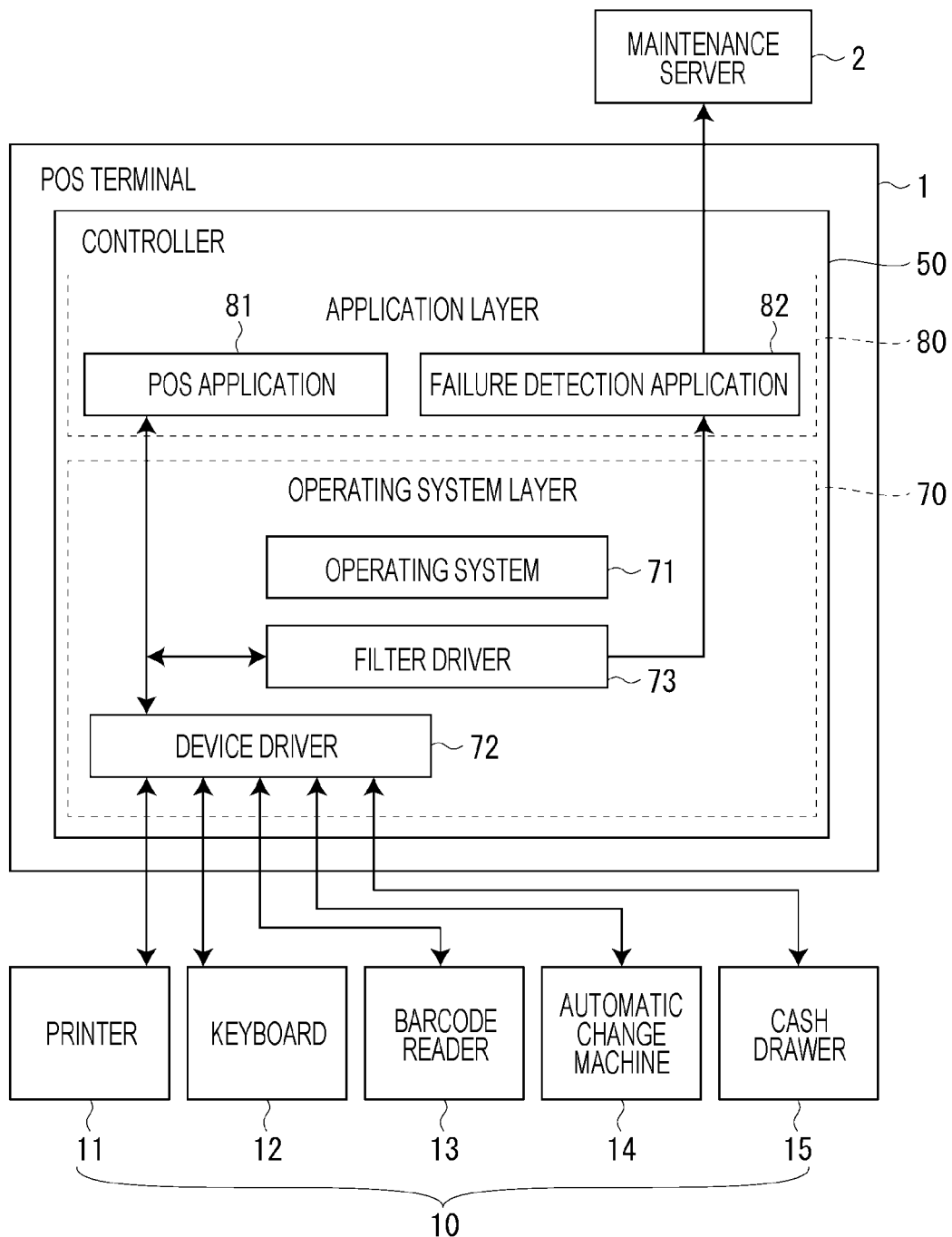
FIG. 3 is a block diagram illustrating the software structure of a controller.

FIG. 3 s a block diagram illustrating the software structure of the controller 50. As illustrated in the drawing, the controller 50 has an operating system layer 70 and an application layer 80 as a software hierarchy.

An operating system 71, a device driver 72, and a filter driver 73 are incorporated into the operating system layer 70. A POS application 81 and a failure detection application 82 are incorporated into the application layer 80. The POS application 81 is an example of a first application. The failure detection application 82 is an example of a second application and a program.

The operating system 71, device driver 72, filter driver 73, POS application 81, and failure detection application 82 are all stored in the HDD 54 (memory).

The operating system 71 is a software program that manages the entire operation of the controller 50. The device driver 72 is a software program through which data is received and output between the controller 50 and peripherals 10. The filter driver 73 is a software program that acquires, through the device driver 72, communication information received and output between the POS application 81 and the peripherals 10. The POS application 81 is a software program that performs accounting processing.

The failure detection application 82 is software program that defines a decision reference and makes a decision about an abnormality related to the peripheral 10. The CPU 51 reads out the failure detection application 82 from the HDD 54 and executes the failure detection application 82 to acquire communication information from the filter driver 73 over a predetermined period and to store the acquired communication information in the communication information storage area 54a. The communication information acquired by the filter driver 73 includes time information indicating a time of communication performed between the POS application 81 and the peripheral 10. The CPU 51 also defines a decision reference according to the communication information acquired over the predetermined period and stored in the communication information storage area 54a, and stores the defined decision reference in the decision reference storage area 54b. The CPU 51 also compares communication information acquired by the filter driver 73 after the elapse of the predetermined period with the decision reference stored in the decision reference storage area 54b, and makes a decision about an abnormality related to the peripheral 10.

When the CPU 51 reads out the failure detection application 82 from the HDD 54 and executes the failure detection application 82, the CPU 51 further transmits, to the maintenance server 2, communication information acquired when the CPU 51 decides that there is an abnormality in the peripheral 10. The maintenance server 2 displays the communication information on the display screen. The operator of the maintenance server 2 confirms the communication information and makes a decision about the communication information as to whether to recognize the abnormality. The maintenance server 2 then transmits, to the POS terminal 1, decision information indicating a result of the decision as to whether to recognize the abnormality. Upon receipt of the decision information from the maintenance server 2, the CPU 51 updates the decision reference according to the received decision information.

Specific examples will be described below to explain decision reference defining processing to define a decision reference by using the failure detection application 82 and to explain abnormality deciding processing to make a decision about an abnormality related to the peripheral 10. In the description below, the main body for processing executed by the CPU 51 in the controller 50 will be simply referred to as the controller 50.

Figure 4:
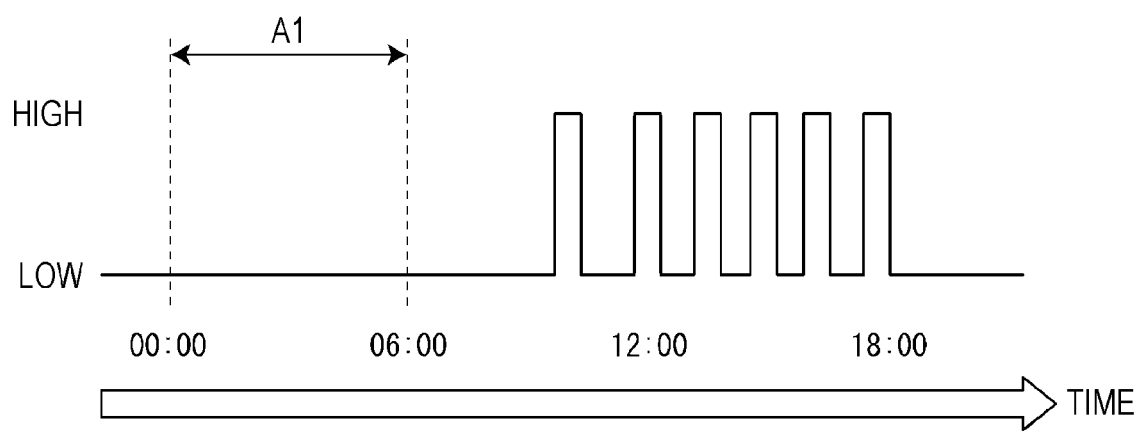
FIG. 4 illustrates an example of signals output from a cash drawer.

First decision reference defining processing will be described first in which a decision reference is defined according to which a decision is made about an abnormality related to the cash drawer 15. FIG. 4 illustrates an example of signals output from the cash drawer 15. As illustrated in the drawing, a high signal and a low signal are output from the cash drawer 15 by using a sensor as information that indicates an "open drawer" status, which indicates that the drawer in which cash is stored is open, or a "closed drawer" status, which indicates the drawer is closed. However, the indications of these signals are different depending on the manufacturer or model of the cash drawer 15. Therefore, it is not possible to determine which of the high signal and low signal indicates the "open drawer" status or "closed drawer" status. In view of this, the controller 50 first needs to determine the statuses indicated by the high signal and low signal.

FIG. 4 illustrates signals output from the cash drawer 15 during a period from 00:00 to 18:00. When the retail store at which the POS terminal 1 is installed is not open late at night, cash is not dispensed nor is it accepted by using the cash drawer 15 in, for example, the time slot A1, indicated in the drawing, from 0:00 to 6:00. During this time slot, therefore, a signal indicating the "closed drawer" status is supposed to be output from the cash drawer 15. Accordingly, the controller 50 can determine the statuses indicated by signals from the signal output from the cash drawer 15 in the particular time slot A1. In the example in the drawing, the controller 50 can decide that the high signal indicates the "open drawer" status and the low signal indicates the "closed drawer" status.

Figure 5:
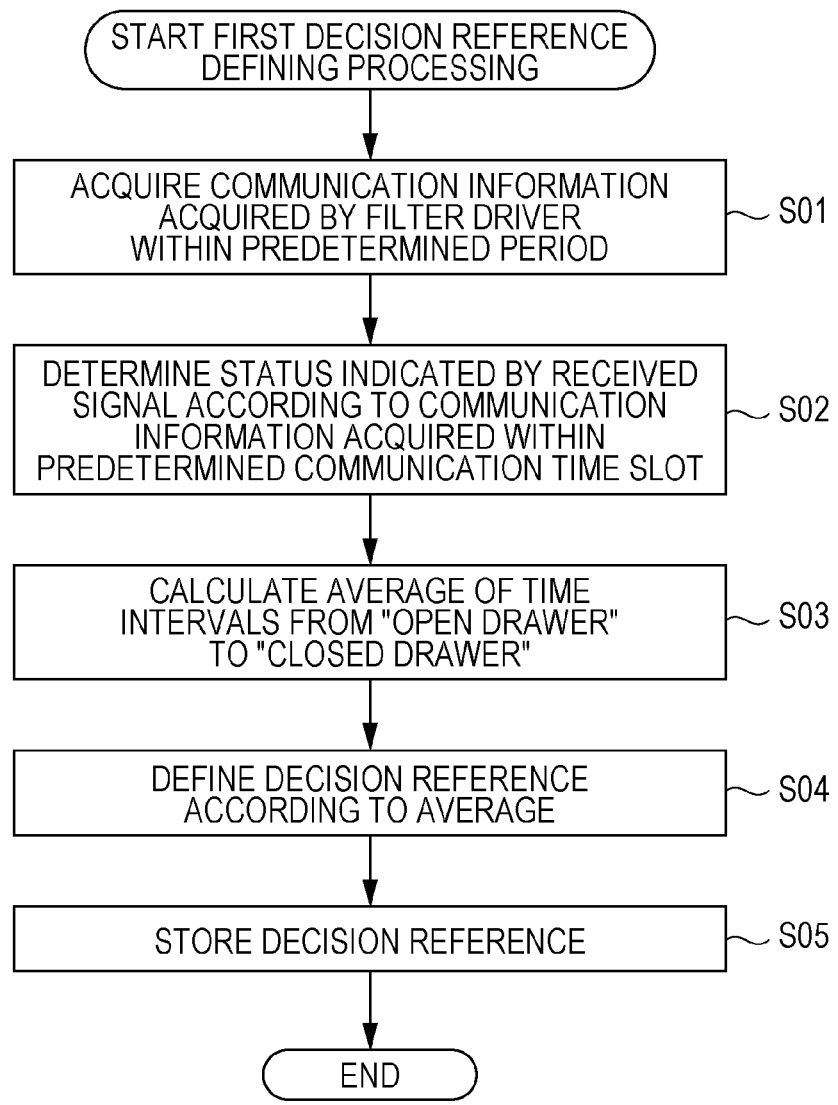
FIG. 5 is a flowchart illustrating a flow of first decision reference defining processing.

FIG. 5 is a flowchart illustrating a flow of first decision reference defining processing. Processing in the flowcharts in FIG. 5 and later is executed by the CPU 51 according to the failure detection application 82 read out from the HDD 54.

In S01 in FIG. 5, the controller 50 acquires, from the communication information storage area 54a, communication information acquired by the filter driver 73 within a predetermined period. Communication information is information that is received and output between the POS application 81 and the device driver 72 and is then acquired by the filter driver 73, as described above. The controller 50 continues to acquire communication information during the predetermined period regardless of whether the predetermined period is in the business hours of the retail store. Communication information is generated each time a signal is output from the cash drawer 15.

The predetermined period may be a certain period such as several days or several weeks. Alternatively, the predetermined period may be a period until the number of times a predetermined trigger such as the activation of the POS terminal 1 reaches a predetermined number of times or may be a period from when the user issues a start command until the user issues an end command. Upon the completion of S01, the controller 50 proceeds to S02.

In S02, the controller 50 determines the status indicated by the signal output from the cash drawer 15, according to communication information acquired by the filter driver 73 within a predetermined communication time slot, the communication information being part of the communication information acquired in S01 within the predetermined period. The signal is either of a high signal and a low signal. The predetermined communication time slot refers to a time slot outside the business hours of the retail store at which the POS terminal 1 is installed. Information about the business hours of the retail store is stored in a predetermined storage area in the POS terminal 1 so that the information can be read out by using the failure detection application 82. The controller 50 decides whether the communication information was acquired in the predetermined communication time slot, with reference to time information included in the communication information. The status indicated by the signal output from the cash drawer 15 is determined as described above. Upon the completion of S02, the controller 50 proceeds to S03.

In S03, the controller 50 calculates the average of time intervals from the "open drawer" status of the cash drawer 15 to its "closed drawer" status. For example, it will be assumed that communication occurred four times in the predetermined communication time slot, starting from "open drawer" followed by "closed drawer", "open drawer", and "closed drawer" in that order and that a time interval from the first "open drawer" to "closed drawer" is 10 seconds and a time interval from the second "open drawer" to "closed drawer" is 30 seconds. Then, the controller 50 calculates the average of the time intervals to be 20 seconds. The time interval is calculated according to the time information included in the communication information. Upon the completion of S03, the controller 50 proceeds to S04.

In S04, the controller 50 defines a decision reference according to the average calculated in S03. For example, as a decision reference, the controller 50 defines a predetermined multiple of the average calculated in S03, such as, for example, 40 seconds, which is twice 20 seconds. Upon the completion of S04, the controller 50 proceeds to S05.

In S05, the controller 50 stores the decision reference defined in S04 in the decision reference storage area 54b. Upon the completion of S05, the controller 50 terminates the decision reference defining processing.

As described above, in first decision reference defining processing, a time interval is defined as a decision reference. In abnormality deciding processing (see FIG. 8), which will be described later, when the controller 50 decides from the acquired communication information that a time interval from the "open drawer" status of the cash drawer 15 to its "closed drawer" status is longer than the time interval defined as the decision reference, the controller 50 decides that there is an abnormality related to the peripheral 10.

Besides the cash drawer 15, first decision reference defining processing can also be applied to other peripherals 10. For example, first decision reference defining processing may be applied to the printer 11, in which case the controller 50 may calculate the average of time intervals from the "open cover" status of a cover provided for the printer 11 to the "closed cover" status of the cover and may define a decision reference according to the calculated average. A possible example of the cover is a lid that covers a storage section in which a roll of paper, which is a print medium of the printer 11, is stored.

When the printer 11 has a feed switch to execute manual paper feed, the controller 50 may calculates the average of time intervals from an "on" status of the feed switch to its "off" status and may define a decision reference according to the calculated average.

When the printer 11 is intended to perform printing on single-cut sheets such as checks, the controller 50 may calculate the average of time intervals from a "with single-cut sheet" status indicating that a single-cut sheet after printing is left on the printer 11 to a "without single-cut sheet" status indicating that a single-cut sheet has been taken out and may define a decision reference according to the calculated average.

The statuses of the printer 11 such as "open cover", "closed cover", "on", "off", "with single-cut sheet", and "without single-cut sheet" can be determined according to communication information, acquired in the predetermined communication time slot, that indicates a high signal or low signal, as in first decision reference defining processing.

Next, second decision reference defining processing different from the above will be described in which a decision reference according to which a decision is made about an abnormality related to the printer 11 is defined. Since the printer 11 uses a protocol specific to the manufacturer, the controller 50 may not interpret data output from the printer 11. In second decision reference defining processing, therefore, a decision is made about an abnormality related to the printer 11 by using PING and PONG that are periodically transmitted between the POS terminal 1 and the printer 11.

Figure 6:
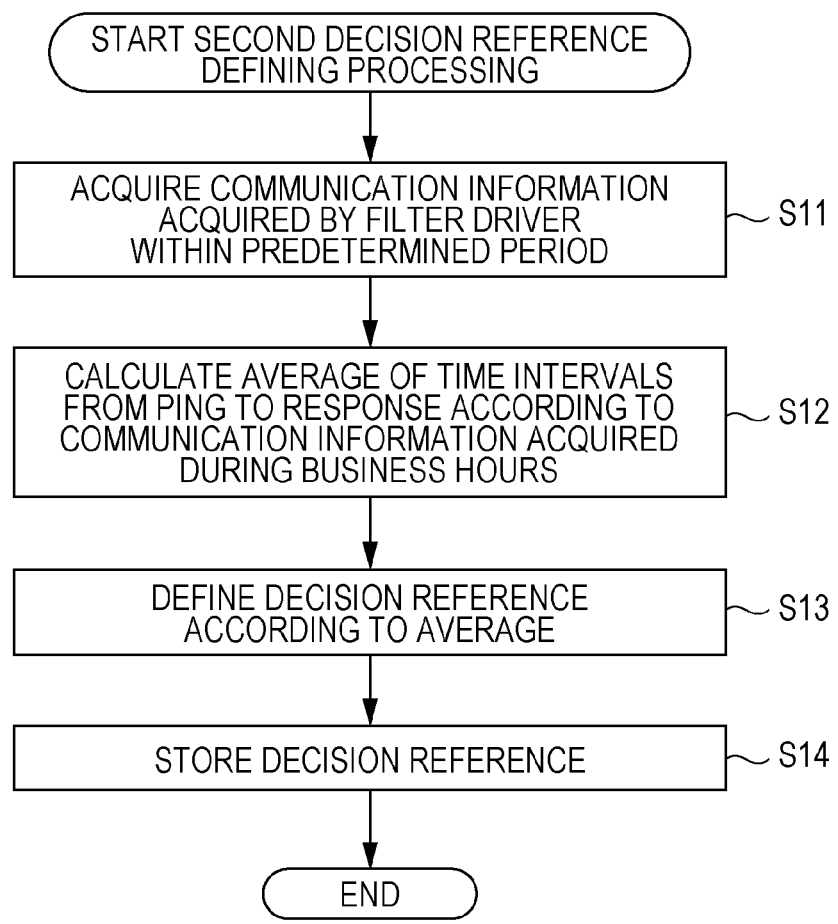
FIG. 6 is a flowchart illustrating a flow of second decision reference defining processing.

FIG. 6 is a flowchart illustrating a flow of second decision reference defining processing. In S11 in FIG. 6, the controller 50 acquires, from the communication information storage area 54a, communication information acquired by the filter driver 73 within a predetermined period. Upon the completion of S11, the controller 50 proceeds to S12.

In S12, the controller 50 calculates the average of time intervals from transmission of PING to reception of a response according to communication information acquired by the filter driver 73 during the business hours, the communication information being part of the communication information acquired in S11 within the predetermined period. Specifically, the controller 50 calculates the average of time intervals from when PING is output from the POS terminal 1 to the printer 11 until a response to PING is received from the printer 11. For example, it will be assumed that communication occurred four times in the predetermined communication time slot, starting from "PING" followed by "response", "PING", and "response" in that order and that a time interval from the first "PING" to "response" is 1 second and a time interval from the second "PING" to "response" is 3 seconds. Then, the controller 50 calculates the average of the time intervals to be 2 seconds. As in first decision reference defining processing, the controller 50 decides whether the communication information was acquired in the business hours, with reference to time information included in the communication information. In calculation of a time interval from "PING" to "response" as well, the controller 50 references the time information included in the communication information. Upon the completion of S12, the controller 50 proceeds to S13.

In S13, the controller 50 defines a decision reference according to the average calculated in S12. For example, as a decision reference, the controller 50 defines a predetermined multiple of the average calculated in S12, such as, for example, 4 seconds, which is twice 2 seconds. Upon the completion of S13, the controller 50 proceeds to S14.

In S14, the controller 50 stores the decision reference defined in S13 in the decision reference storage area 54b. Upon the completion of S14, the controller 50 terminates the decision reference defining processing.

As described above, in second decision reference defining processing, a time interval is defined as a decision reference. In abnormality deciding processing (see FIG. 8), which will be described later, when the controller 50 decides from the acquired communication information that a time interval from when PING is output from the POS terminal 1 to the printer 11 until a response to PING is received from the printer 11 is longer than the time interval defined as the decision reference, the controller 50 decides that there is an abnormality related to the peripheral 10.

An application of second decision reference defining processing will be described. When arbitrary data is output from the POS terminal 1, a frequency with which each type of data is received from the printer 11 may be obtained according to the communication information acquired in S11 within the predetermined period and a combination of arbitrary data and the data with the highest frequency may be defined as a decision reference. In this case, in abnormality deciding processing, which will be described later, when the controller 50 decides from the acquired communication information that data that is not defined in the decision reference is received in response to data output from the POS terminal 1 to the printer 11, the controller 50 decides that there is an abnormality related to the peripheral 10.

Besides the printer 11, second decision reference defining processing can also be applied to peripherals 10 the states of which the controller 50 periodically checks, such as, for example, the automatic change machine 14.

Next, third decision reference defining processing will be described in which a decision reference according to which a decision is made about an abnormality related to the display 12 is defined. For example, it will be assumed that the POS terminal 1 and display 12 are coupled together through signal lines of a serial interface cable. Then, when the controller 50 opens the COM port of the display 12 by using the POS application 81, some input signal lines may change to a high or low level. In third decision reference defining processing, therefore, a change in the signal level at the opening of the COM port is used to make a decision about an abnormality related to the display 12.

Figure 7:
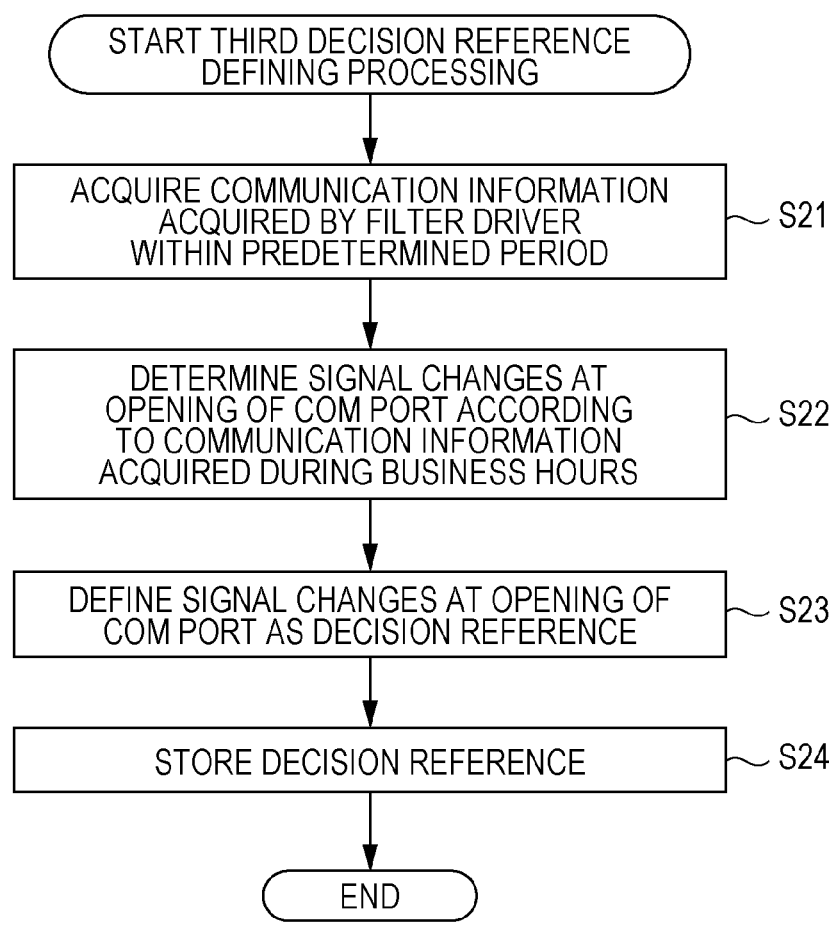
FIG. 7 is a flowchart illustrating a flow of third decision reference defining processing.

FIG. 7 is a flowchart illustrating a flow of third decision reference defining processing. In S21 in FIG. 7, the controller 50 acquires, from the communication information storage area 54a, communication information acquired by the filter driver 73 within a predetermined period. Upon the completion of S21, the controller 50 proceeds to S22.

In S22, the controller 50 determines signal changes at the opening of the COM port according to communication information acquired by the filter driver 73 during the business hours, the communication information being part of the communication information acquired in S21 within the predetermined period. The controller 50 determines the signal change with the highest frequency from the signal changes at the opening of the COM port, according to communication information acquired in S21 within the predetermined period. As in first decision reference defining processing, the controller 50 decides whether the communication information was acquired in the business hours, with reference to time information included in the communication information. Upon the completion of S22, the controller 50 proceeds to S23.

In S23, the controller 50 defines the signal changes, determined in S22, at the opening of the COM port as a decision reference. Upon the completion of S23, the controller 50 proceeds to S24.

In S24, the controller 50 stores the decision reference defined in S23 in the decision reference storage area 54b. Upon the completion of S24, the controller 50 terminates the decision reference defining processing.

As described above, in third decision reference defining processing, signal changes are defined as a decision reference. In abnormality deciding processing (see FIG. 8), which will be described later, when the controller 50 decides from the acquired communication information that a signal change at the opening of the COM port differs from the signal changes defined as the decision reference, the controller 50 decides that there is an abnormality related to the peripheral 10.

Besides the display 12, third decision reference defining processing can also be applied to peripherals 10 that do not output data to the POS terminal 1.

Next, abnormality decision processing will be described in which a decision is made about an abnormality related to the peripheral 10. FIG. 8 is a flowchart illustrating a flow of abnormality decision processing. Abnormality decision processing is executed after any of first to third decision reference defining processing in FIGS. 5 to 7 is executed, that is, after a decision reference is stored in the decision reference storage area 54b. Abnormality decision processing is repeated in the business hours of the retail store periodically or each time communication information is generated.

In S31 in FIG. 8, the controller 50 acquires communication information acquired by the filter driver 73. Communication information includes information indicating the status of the relevant peripheral 10, information indicating a request to the peripheral 10 and a response from the peripheral 10, and information indicating a signal change in a signal line, for example. Upon the completion of S31, the controller 50 proceeds to S32.

In S32, the controller 50 compares the communication information acquired in S31 with the decision reference stored in the decision reference storage area 54b. Upon the completion of S32, the controller 50 proceeds to S33.

In S33, according to the comparison result in S32, the controller 50 decides whether there is an abnormality related to the peripheral 10. Specifically, when the communication information acquired in S31 satisfies the condition for the decision reference stored in the decision reference storage area 54b, the controller 50 decides that there is no abnormality related to the peripheral 10 (No in S33); and when the communication information does not satisfy the condition, the controller 50 decides that there is an abnormality related to the peripheral 10 (Yes in S33). When the result in step S33 is No, the controller 50 terminates the abnormality decision processing. When the result in step S33 is Yes, the controller 50 proceeds to S34.

In S34, the controller 50 notifies the maintenance server 2 of the abnormality. Here, the controller 50 transmits, to the maintenance server 2, information indicating that the controller 50 decided that there is an abnormality related to the peripheral 10 and communication information corresponding to the decision result indicating that there is an abnormality. For example, when the controller 50 decides that there is an abnormality because a time interval from the "open drawer" status of the cash drawer 15 to its "closed drawer" status is longer than the time interval defined as the decision reference, the controller 50 transmits, to the maintenance server 2, communication information about communication involved in the "open drawer" status of the cash drawer 15 and communication information about communication involved in the "closed drawer" status of the cash drawer 15. On the same side as the maintenance server 2, a decision is made about the transmitted communication information as to whether to recognize the abnormality, after which the maintenance server 2 transmits, to the POS terminal 1, decision information indicating a result of the decision as to whether to recognize the abnormality. Upon the completion of S34, the controller 50 proceeds to S35.

In S35, the controller 50 receives the decision information from the maintenance server 2. Upon the completion of S35, the controller 50 proceeds to S36.

In S36, the controller 50 updates the decision reference according to the decision information received from the maintenance server 2. For example, it will be assumed that the controller 50 decides in S33 that there is an abnormality because a time interval from the "open drawer" status of the cash drawer 15 to its "closed drawer" status is one second longer than the time interval, which is, for example, 60 seconds, defined as the decision reference, and that the controller 50 receives, from the maintenance server 2, decision information indicating that the abnormality should not be recognized. Then, the controller 50 prolongs the time interval defined as the decision reference to 61 seconds.

Upon the completion of S36, the controller 50 terminates the abnormality decision processing.

As described above, the POS terminal 1 in this embodiment uses the failure detection application 82 to acquire communication information from the filter driver 73 over a predetermined period, the communication information being related to communication performed between the POS application 81 and a peripheral 10 through the device driver 72, after which the POS terminal 1 defines a decision reference according to the communication information acquired over the predetermined period, compares communication information acquired by the filter driver 73 after the predetermined period with the defined decision reference, and makes a decision about an abnormality related to the peripheral 10. Therefore, when an abnormality deciding function is to be added to the POS terminal 1, the POS application 81 does not need to be modified.

There may be a case in which the POS terminal 1 is coupled to peripherals 10 through serial interfaces and thereby cannot monitor the states of the peripherals 10 in a unified manner. Even in this case, when the POS terminal 1 defines a decision reference according to communication information acquired over a predetermined period, the POS terminal 1 can make a decision about an abnormality related to the peripheral 10.

Since the POS terminal 1 acquires communication information including time information from the filter driver 73 and defines a decision reference according to communication information acquired within a predetermined communication time slot, the POS terminal 1 can define an appropriate decision reference matching, for example, the form of the operation of the retail store at which the POS terminal 1 is installed.

Since the POS terminal 1 receives decision information from the maintenance server 2 and updates the decision reference according to the received decision information, the POS terminal 1 can define a more appropriate decision reference. Thus, the POS terminal 1 can make a more appropriate decision about an abnormality related to the peripheral 10.

Besides the above embodiment, variations described below can be used.
First Variation In S34 in abnormality decision processing illustrated in FIG. 8, the controller 50 has transmitted, to the maintenance server 2, information indicating that the controller 50 had decided that there is an abnormality related to the peripheral 10 and communication information corresponding to the decision result indicating that there is an abnormality. However, the controller 50 may transmit communication information acquired within a predetermined time before the controller 50 decides that there is an abnormality. In this case, the maintenance server 2 may create decision information indicating whether to recognize the abnormality in consideration of not only the communication information corresponding to the decision result indicating that there is an abnormality but also the communication information acquired within the predetermined time.
Second Variation In S33 in abnormality decision processing illustrated in FIG. 8, only when the controller 50 decides that there is an abnormality, the controller 50 has transmitted communication information to the maintenance server 2. However, the controller 50 may transmit communication information to the maintenance server 2 together with a decision result, regardless of whether the controller 50 has decided that there is an abnormality. In this case, the maintenance server 2 may be structured so that only when it is decided on the same side as the maintenance server 2 that the decision result is not appropriate, the maintenance server 2 transmits decision information to the POS terminal 1.
Third Variation In S33 in abnormality decision processing, when the controller 50 decides that there is an abnormality, the controller 50 may not only notify the maintenance server 2 but also may make a notification of the abnormality to indicate, on the POS terminal 1, the abnormality to the operator of the POS terminal 1. For example, the controller 50 may display a message indicating the abnormality on the display 12.
Fourth Variation In the embodiment described above, the controller 50 has acquired communication information received and output between the POS application 81 and the device driver 72 by using the filter driver 73. However, a printer driver provided by the manufacturer of the printer 11 or a UPOS, which is a standard in POS, may be provided in the application layer 80 so that communication information passing through the driver can also be acquired. Specifically, the controller 50 may be structured so that it can also acquire communication information received or output in an order starting from the POS application 81, followed by the printer driver and device driver 72 in that order or in the reverse order, or communication information received or output in an order starting from the POS application 81, followed by the UPOS driver and device driver 72 in that order or in the reverse order. The POS terminal 1 in the above embodiment acquires communication information by using the filter driver 73 incorporated into the operating system layer 70. Therefore, even in the structure in which a printer driver or UPOS driver is provided as described above, the POS terminal 1 can acquire communication information and can make a decision about an abnormality related to the peripheral 10 without having to modify the POS application 81.
Fifth Variation In the embodiment described above, the communication information storage area 54a in which communication information is stored has been provided in the POS terminal 1. However, the communication information storage area 54a may be provided outside the POS terminal 1, that is, in an apparatus that can communicate with the POS terminal 1.
Sixth Variation The failure detection application 82 may be provided in the maintenance server 2. In this case, it suffices for the POS terminal 1 to transmit acquired communication information to the maintenance server 2 periodically or at each communication information acquisition. It also suffices for the maintenance server 2 to execute decision reference defining processing and abnormality deciding processing according to the communication information transmitted from the POS terminal 1. In this case, for each POS terminal 1, the maintenance server 2 may acquire communication information, may define a decision reference, and may make a decision about an abnormality. Alternatively, the maintenance server 2 may define a decision reference common to a plurality of POS terminals 1 according to communication information acquired from the plurality of POS terminals 1, and may make a decision about an abnormality related to the peripherals 10 coupled to each POS terminal 1 according to the defined common decision reference.
Seventh Variation In the embodiment described above, the operator of the maintenance server 2 has made a decision about the communication information transmitted from the POS terminal 1 as to whether to recognize the abnormality. However, a controller in the maintenance server 2 may read out a program stored in a storage in the maintenance server 2 and may execute the program to make a decision about the communication information transmitted from the POS terminal 1 as to whether to recognize the abnormality. In this case, it suffices for the controller in the maintenance server 2 to create decision information indicating whether to recognize the abnormality and transmit the created decision information to the POS terminal 1.

Eighth Variation

It is also possible to provide methods of executing the individual pieces of processing, described in the above embodiment and variations, in the POS terminal 1 and programs that execute these pieces of processing, in the form of a type of storage medium such as a compact disc-read-only memory (CD-ROM) or flash memory in which the programs are stored so that the programs can be read by any of controllers including a computer and a processor. These aspects are also included in the scope of the rights of the present disclosure. In the embodiment described above, the communication system SY has included the POS terminal 1, peripherals 10, and maintenance server 2. However, the communication system SY may lack the maintenance server 2. In addition, modifications can be appropriately made without departing from the scope of the present disclosure.

Notes

A method of controlling an information processor, a non-transitory controller-readable medium storing a program, and a communication system will be additionally described below.

A method of controlling a POS terminal 1 is a method of controlling a POS terminal 1 configured to communicate with a peripheral 10, the POS terminal 1 having a device driver 72, a POS application 81 configured to communicate with the peripheral 10 through the device driver 72, and a filter driver 73 configured to acquire communication information related to communication performed between the POS application 81 and the peripheral 10 through the device driver 72, the communication information including time information indicating a time of the communication. The method includes: acquiring communication information from the filter driver 73 over a predetermined period; storing the acquired communication information in a communication information storage area 54a; defining a decision reference according to which a decision is made about an abnormality caused during communication with the peripheral 10 or an abnormality in the peripheral 10, according to the communication information stored in a communication information storage area 54a; and making a decision about an abnormality caused during communication with the peripheral 10 or an abnormality in the peripheral 10 through a comparison between the defined decision reference and communication information acquired from the filter driver 73 after the predetermined period.

A failure detection application 82 causes a controller 50 in a POS terminal 1 configured to communicate with a peripheral 10, the POS terminal 1 having a device driver 72, a POS application 81 configured to communicate with the peripheral 10 through the device driver 72, and a filter driver 73 configured to acquire communication information related to communication performed between the POS application 81 and the peripheral 10 through the device driver 72, the communication information including time information indicating a time of the communication, to execute acquiring communication information from the filter driver 73 over a predetermined period and storing the acquired communication information in a communication information storage area 54a, defining a decision reference according to which a decision is made about an abnormality caused during communication with the peripheral 10 or an abnormality in the peripheral 10, according to the communication information stored in the communication information storage area 54a, and making a decision about an abnormality caused during communication with the peripheral 10 or an abnormality in the peripheral 10 through a comparison between the defined decision reference and communication information acquired from the filter driver 73 after the predetermined period. The POS application 81, failure detection application 82, device driver 72, and filter driver 73 can be stored in a storage medium such as the HDD 54 readable by the CPU 51. In addition, these can also be provided by being stored in any of various storage media readable by the CPU 51, such as a CD-ROM and a flash memory.

A communication system SY has a peripheral 10 and a POS terminal 1 configured to have a device driver 72, a POS application 81 configured to communicate with the peripheral 10 through the device driver 72, a filter driver 73 configured to acquire communication information related to communication performed between the POS application 81 and the peripheral 10 through the device driver 72, the communication information including time information indicating a time of the communication, and a failure detection application 82 configured to acquire communication information from the filter driver 73 over a predetermined period, define a decision reference according to which a decision is made about an abnormality caused during communication with the peripheral 10 or an abnormality in the peripheral 10, according to the communication information acquired over the predetermined period, and make a decision about an abnormality caused during communication with the peripheral 10 or an abnormality in the peripheral 10 through a comparison between the defined decision reference and communication information acquired from the filter driver 73 after the predetermined period.

With this structure, the POS terminal 1 acquires communication information from the filter driver 73 over a predetermined period, the communication information being related to communication performed between the POS application 81 and the peripheral 10 through the device driver 72, defines a decision reference according to which a decision is made about an abnormality caused during communication with the peripheral 10 or an abnormality in the peripheral 10, according to the communication information acquired over the predetermined period, and makes a decision about an abnormality caused during communication with the peripheral 10 or an abnormality in the peripheral 10 through a comparison between the defined decision reference and communication information acquired by the filter driver 73 after the predetermined period. Therefore, when an abnormality deciding function is to be added to the POS terminal 1, the POS application 81 does not need to be modified. It may be difficult to detect an abnormality caused during communication with the peripheral 10 or an abnormality in the peripheral 10 depending on, for example, the form of coupling to the peripheral 10. Even in this case, since a decision reference is defined according to communication information acquired over a predetermined period, it is possible to make a decision about an abnormality caused during communication with the peripheral 10 or an abnormality in the peripheral 10, regardless of the form of coupling to the peripheral 10. Since the POS terminal 1 acquires communication information including time information indicating a time of communication from the filter driver 73 and defines a decision reference according to the time information, the POS terminal 1 can define an appropriate decision reference matching, for example, the form of the operation of the retail store at which the POS terminal 1 is installed.

In the above method of controlling the POS terminal 1, the communication information preferably includes the status of the peripheral 10 and the decision reference is preferably defined according to a time interval at which the status of the peripheral 10 is acquired.

With this structure, the POS terminal 1 can make a decision about an abnormality caused during communication with the peripheral 10 or an abnormality in the peripheral 10 according to a time interval at which the status of the peripheral 10 is acquired.

In the above method of controlling the POS terminal 1, the communication information preferably includes information indicating a request to the peripheral 10 and a response from the peripheral 10, and the decision reference is preferably defined according to a time interval from the request to the response.

With this structure, the POS terminal 1 can make a decision about an abnormality caused during communication with the peripheral 10 or an abnormality in the peripheral 10 according to a time interval from a request to the peripheral 10 to a response.

In the above method of controlling the POS terminal 1, the decision reference is preferably defined according to a time slot during which the communication information was acquired.

With this structure, the POS terminal 1 can make a decision about an abnormality caused during communication with the peripheral 10 or an abnormality in the peripheral 10 according to a time slot during which communication information was acquired.

In the above method of controlling the POS terminal 1, the peripheral 10 is preferably a device involved in accounting processing.

With this structure, it is possible to make a decision about an abnormality caused during communication with a peripheral 10 involved in accounting processing or an abnormality in a peripheral 10 involved in accounting processing.

In the above method of controlling the POS terminal 1, communication with the maintenance server 2 other than the peripheral 10 is preferably performed, and it is preferable to transmit the acquired communication information to the maintenance server 2, to receive, from the maintenance server 2, decision information indicating a result of a decision as to whether to recognize the abnormality, and to update the decision reference according to the received decision information.

With this structure, since the POS terminal 1 updates the decision reference according to the decision information received from the maintenance server 2, the POS terminal 1 can define a more appropriate decision reference. Thus, the POS terminal 1 can make a more appropriate decision about an abnormality caused during communication with the peripheral 10 or an abnormality in the peripheral 10.

What is claimed is:

1. A method of controlling an information processor configured to communicate with a peripheral, the information processor having a device driver, an application configured to communicate with the peripheral through the device driver, and a filter driver configured to acquire communication information related to communication performed between the application and the peripheral through the device driver, the communication information including time information indicating a time of the communication, the method comprising:
acquiring communication information from the filter driver over a predetermined period;
defining a decision reference to make a decision about an abnormality caused during communication with the peripheral or an abnormality in the peripheral, according to a time interval between the acquired communication information, the time interval being defined according to the time information of the acquired communication information, the time interval being (a) a time interval from one status of the peripheral to the another status, or (b) a time interval from a request to the peripheral to a response based on the request; and
making a decision about an abnormality caused during communication with the peripheral or an abnormality in the peripheral through a comparison between the defined decision reference and communication information acquired from the filter driver after the predetermined period.

2. The method according to claim 1, wherein the decision reference is defined according to a time slot during which the communication information was acquired.

3. The method according to claim 1, wherein the peripheral is a device involved in accounting processing.

4. The method according to claim 1, wherein communication with an external server other than the peripheral is performed, the method comprising:
transmitting the acquired communication information to the external server after making the decision about the abnormality caused during communication with the peripheral or the abnormality in the peripheral; and
receiving, from the external server, decision information indicating a result of a decision whether the peripheral is the abnormality; and
updating the decision reference according to the decision information in a case that the decision information indicates that the peripheral is not the abnormality.

5. A non-transitory controller-readable medium storing a program causing a processor in an information processor configured to communicate with a peripheral, the information processor having a device driver, an application configured to communicate with the peripheral through the device driver, and a filter driver configured to acquire communication information related to communication performed between the application and the peripheral through the device driver, the communication information including time information indicating a time of the communication, to:
acquire communication information from the filter driver over a predetermined period;
define a decision reference to make a decision about an abnormality caused during communication with the peripheral or an abnormality in the peripheral, according to a time interval between the acquired communication information, the time interval being defined according to the time information of the acquired communication information, the time interval being (a) a time interval from one status of the peripheral to the another status, or (b) a time interval from a request to the peripheral to a response based on the request; and
make a decision about an abnormality caused during communication with the peripheral or an abnormality in the peripheral through a comparison between the defined decision reference and communication information acquired from the filter driver after the predetermined period.

6. The medium according to claim 5, wherein the decision reference is defined according to a time slot during which the communication information was acquired.

7. The medium according to claim 5, wherein the peripheral is a device involved in accounting processing.

8. The medium according to claim 5, wherein:
the information processor is configured to communicate with an external server other than the peripheral; and
the program causes the processor in the information processor to transmit the acquired communication information to the external server after making the decision about the abnormality caused during communication with the peripheral or the abnormality in the peripheral and receive, from the external server, decision information indicating a result of a decision whether the peripheral is the abnormality, and update the decision reference according to the decision information in case that the decision information indicates that the peripheral is not the abnormality.

9. A communication system comprising:
a peripheral; and
an information processor configured to have a device driver, a first application configured to communicate with the peripheral through the device driver, a filter driver configured to acquire communication information related to communication performed between the first application and the peripheral through the device driver, the communication information including time information indicating a time of the communication, and a second application configured to acquire communication information from the filter driver over a predetermined period, to define a decision reference to make a decision about an abnormality caused during communication with the peripheral or an abnormality in the peripheral, according to a time interval between the communication information acquired over the predetermined period, the time interval being defined according to the time information of the acquired communication information, the time interval being (a) a time interval from one status of the peripheral to the another status, or (b) a time interval from a request to the peripheral to a response based on the request; and
to make a decision about an abnormality caused during communication with the peripheral or an abnormality in the peripheral through a comparison between the defined decision reference and communication information acquired from the filter driver after the predetermined period.

10. The communication system according to claim 9, wherein the decision reference is defined according to a time slot during which the communication information was acquired.

11. The communication system according to claim 9, wherein:
the peripheral is a device involved in accounting processing.

12. The communication system according to claim 9, wherein:
the information processor is configured to communicate with an external server other than the peripheral; and
the information processor transmits the acquired communication information to the external server after making the decision about the abnormality caused during communication with the peripheral or the abnormality in the peripheral and receives, from the external server, decision information indicating a result of a decision whether the peripheral is the abnormality, and
updates the decision reference according to the decision information in case that the decision information indicates that the peripheral is not the abnormality.

13. The method according to claim 1, wherein communication with an external server other than the peripheral is performed, the method comprising:
transmitting the acquired communication information to the external server after making the decision about the abnormality caused during communication with the peripheral or the abnormality in the peripheral.

* * * * *